US012577123B2

(12) United States Patent
Gao et al.

(10) Patent No.: US 12,577,123 B2
(45) Date of Patent: Mar. 17, 2026

(54) COPPER OXIDE WITH HOLLOW POROUS STRUCTURE, AND PREPARATION METHOD THEREFOR AND USE THEREOF

(71) Applicant: YANSHAN UNIVERSITY, Qinhuangdao (CN)

(72) Inventors: Faming Gao, Qinhuangdao (CN); Yisong Zhao, Qinhuangdao (CN); Kuo Wei, Qinhuangdao (CN); Xue Zuo, Qinhuangdao (CN); Yuping Mi, Qinhuangdao (CN)

(73) Assignee: YANSHAN UNIVERSITY, Qinhuangdao (CN)

( * ) Notice: Subject to any disclaimer, the term of this patent is extended or adjusted under 35 U.S.C. 154(b) by 191 days.

(21) Appl. No.: 18/287,190

(22) PCT Filed: Sep. 28, 2022

(86) PCT No.: PCT/CN2022/122157
§ 371 (c)(1),
(2) Date: Oct. 17, 2023

(87) PCT Pub. No.: WO2023/078005
PCT Pub. Date: May 11, 2023

(65) Prior Publication Data
US 2024/0199437 A1      Jun. 20, 2024

(30) Foreign Application Priority Data
Nov. 4, 2021      (CN) .......................... 202111301697.2

(51) Int. Cl.
G01N 27/327      (2006.01)
C01G 3/02      (2006.01)

(52) U.S. Cl.
CPC ........... C01G 3/02 (2013.01); G01N 27/3271 (2013.01); G01N 27/3278 (2013.01);
(Continued)

(58) Field of Classification Search
CPC ............ G01N 27/327; G01N 27/3271; G01N 27/3272; G01N 27/3278
See application file for complete search history.

(56) References Cited

U.S. PATENT DOCUMENTS 10,710,894 B1      7/2020   Geng et al.

FOREIGN PATENT DOCUMENTS

CN      101274749 A      10/2008
CN      109731586 A      5/2019
(Continued)

OTHER PUBLICATIONS

Chen et al., "Chemical reaction controlled synthesis of Cu2O hollow octahedra and core-shell structures," CrystEngComm, 2013, 15, 10028 (Year: 2013).*
(Continued)

*Primary Examiner* — Alexander S Noguerola
(74) *Attorney, Agent, or Firm* — Nitin Kaushik

(57)      ABSTRACT

A copper oxide with a hollow porous structure, a preparation method therefor, and a use thereof are provided. The copper oxide with a hollow porous structure is of a hollow octahedral structure, and has a size of 200-400 nm and a specific surface area of 23.5-79.6 m$^2$/g, where the surface of the octahedron is composed of copper oxide nanoparticles having a size of 14-33 nm, and pore structures are formed among the copper oxide nanoparticles. The copper oxide with the hollow porous structure has good conductivity, high hydrophilicity and good catalytic performance, can substantially reduce the detection potential and greatly improve the detection sensitivity and the anti-interference performance when used for the electrochemical detection of pesticides.

3 Claims, 4 Drawing Sheets

(52) U.S. Cl.
CPC ...... *C01P 2002/72* (2013.01); *C01P 2004/03* (2013.01); *C01P 2004/04* (2013.01); *C01P 2004/41* (2013.01); *C01P 2004/64* (2013.01); *C01P 2006/12* (2013.01); *C01P 2006/40* (2013.01)

(56) References Cited

FOREIGN PATENT DOCUMENTS

| | | |
|---|---|---|
| CN | 109796038 A | 5/2019 |
| CN | 110031521 A | 7/2019 |

OTHER PUBLICATIONS

Long et al, "An amperometric biosensor based on Cu2O@Au nanocomposites for the detection of galectin-1 via lactose-galectin Interactions," Nanotechnology 30 (2019) 485706 (8pp) (Year: 2019).*

Zhang et al., "Low-cost synthesis of hollow Cu2O octahedra with more than one shell," Materials Letters 61 (2007) 4508-4511 (Year: 2007).*

Wang et al., "Growth of Cu particles on a Cu2O truncated octahedron: tuning of the Cu content for efficient glucose sensing," Phys.Chem. Chem. Phys., 2015, 17, 24361 (Year: 2015).*

Cao et al., "Morphology Evolution of Cu2O from Octahedra to Hollow Structures," Crystal Growth & Design, vol. 10, No. 1, 2010 (hereafter "Cao") (Year: 2010).*

Feng et al., "Facile synthesis of hollow Cu2O octahedral and spherical nanocrystals and their morphology dependent photocatalytic properties,". Nanoscale Research Letters 2012, 7:276 (Year: 2012).*

Wang Xu, et al., The Preparation of CuO Gas Sensor From Cu-Based Metal Organic Framework, Journal of Shanghai Polytechnic University, 2020, pp. 43-49, vol. 37, No. 1.

Ting-Ting Li, et al., Facile Synthesis of Porous CuO Polyhedron from Cu-based Metal Organic Framework (MOF-199) for Electrocatalytic Water Oxidation, RSC Advances, 2016, pp. 1-8.

Khizer Hayat, et al., CuO Hollow Cubic Caves Wrapped with Biogenic N Rich Graphitic C for Simultaneous Monitoring of Uric Acid and Xanthine, ACS Appl. Mater. Interfaces, 2020, pp. 47320-47329, vol. 12.

Jing Bao, et al., 3D graphene/copper oxide nano-flowers based acetylcholinesterase biosensor for sensitive detection of organophosphate pesticides, Sensors and Actuators B: Chemical, 2019, pp. 95-101, vol. 279.

Saisai Chen, et al., N-doped Cu—MoFs for efficient electrochemical determination of dopamine and sulfanilamide, Journal of Hazardous Materials, 2020, pp. 1-8, vol. 390, 122157.

* cited by examiner

COPPER OXIDE WITH HOLLOW POROUS STRUCTURE, AND PREPARATION METHOD THEREFOR AND USE THEREOF

CROSS REFERENCE TO THE RELATED APPLICATIONS

This application is the national phase entry of International Application No. PCT/CN2022/122157, filed on Sep. 28, 2022, which is based upon and claims priority to Chinese Patent Application No. 202111301697.2, filed on Nov. 4, 2021, the entire contents of which are incorporated herein by reference.

TECHNICAL FIELD

The present invention relates to the field of materials, particularly to nanomaterial preparation techniques and methods, and more particularly to a copper oxide with a hollow and porous structure, a method for preparing same, and use thereof.

BACKGROUND

With the increasing of world population, people's demand for food also rises. Pesticide plays an extremely important role in agricultural production as it is effective in controlling pests to ensure the yield of grains. However, environmental problems due to long-term improper use of pesticides and problems such as the excessive pesticide residues in food and agricultural products cannot be underestimated. Pesticides accumulate along the food chain, and may be finally taken by people, resulting in nervous system diseases and even death. Now as the governments of various countries continue to strengthen the detection of pesticide residues, the standards are becoming increasingly stringent. Conventional methods for detecting and quantitatively analyzing the pesticide residues mainly include gas chromatography, thin-layer chromatography, liquid chromatography, high-performance liquid chromatography, and combinations of various spectra. Although such methods are sensitive and reliable, their sample pretreatment process is complicated, tedious and time-consuming, they require expensive and large instruments, and also have difficulties in on-site monitoring. Therefore, it is necessary to develop a simple, portable, real-time, fast, and cost-efficient analytical method for pesticides detection.

An electrochemical sensor, as a portable detection instrument, comprises a recognition element (the immobilized electrode material), a conversion part (the electrode), and an electronic device (comprising a signal amplifier, a processor, and a display). It well meets the detection requirements of simplicity, portability, real-time capacity, speed and cost-efficiency and the requirements of on-site environment monitoring. The electrochemical sensors for pesticides detection can be classified into enzyme-based and enzyme-free electrochemical sensors. Among the enzyme-based electrochemical sensors, the most widely used enzyme is acetylcholinesterase (AChE), which has the advantages of wide sources, and the highest catalytic efficiency per unit activity compared to other enzymes, and can be combined with commonly used organophosphorus and carbamate pesticides, thus enabling the detection of various pesticides. The detection range of the enzyme-free electrochemical sensors is often limited as they can only detect one pesticide or pesticides containing a certain group, and the application of the enzyme-free electrochemical sensors in actual detection can be limited. In addition, because the catalytic activity of the nanocatalyst adopted by the enzyme-free electrochemical sensors is far lower than the catalytic activity of an enzyme, electrochemical biosensors based on acetylcholinesterase (AChE) are often constructed to realize the purpose of on-site real-time pesticides monitoring.

The modification of the electrode with nanomaterials is a very important step in constructing electrochemical biosensors. In recent years, because metal oxides have the advantages of stable performance, cost-efficiency, high reusability, environmental friendliness, increasing attention is paid to the application of metal oxides in the electrochemical sensor. Copper oxide, as a multifunctional fine inorganic material with wide application, has excellent catalytic performance and electronic characteristics, and is greatly helpful for improving the conductivity of the sensor, increasing the active surface area of the sensor, improving the biological activity and the electrocatalytic performance, and the like. Studies show that copper oxide has a significant affinity to sulfhydryl compounds and phosphorus-oxygen or phosphorus-sulfur bonds, and may play a role in condensing substrates or pesticides in the electrochemical test process. For example, Patent Application No. 201910035131.6 disclosed in 2019 describes a graded nano porous copper oxide material, which, due to the nano effect and the structure of the material, has a significant electrochemical response to a glucose solution when used in a sensor. However, the patent did not explore the hydrophilicity of the material, while a high hydrophilicity is crucial to the performance of electrochemical biosensors. Akhtar et al. obtained a porous copper oxide by a hydrothermal method, and due to the porosity and good catalytic ability of the copper oxide, the constructed electrochemical sensor can detect uric acid and xanthine (ACS Appl. Mater. Interfaces 2020, 12, 47320-47329). However, the electrochemical impedance value of this copper oxide material is relatively large (greater than 600 ohms), and the hydrophilicity is also poor (a contact angle of 87.5°). If the resistance of the material can be further reduced and its hydrophilicity can be improved, it will be conducive to further improving the detection limit of the electrochemical sensors. Bao et al. prepared an AChE electrochemical sensor for pesticide detection based on a three-dimensional copper oxide nanoflower, and due to the high affinity of the copper oxide for the substrate acetylthiocholine chloride, the sensor provides a good pesticide detection limit (Sensors & Activators: B. Chemical 279 (2019) 95-101). However, the copper oxide cannot achieve the effect of reducing the detection potential, and does not meet the requirement of further improving the sensitivity and anti-interference capability of the sensor. In summary, it is a significant and innovative work to invent a copper oxide with a hollow and porous octahedral structure and a method for preparing same, which can reduce the detection potential of the electrochemical sensor with ultra-small resistance value and ultra-high hydrophilicity.

SUMMARY

In order to overcome the shortcomings of the prior art, the present invention is intended to provide a copper oxide with a hollow and porous structure, and a preparation method, and use thereof. The present invention is specifically as follows:

Provided is a copper oxide with a hollow and porous structure, wherein the copper oxide with a hollow and porous structure has a hollow octahedral structure, the surface of the octahedron is composed of copper oxide nanoparticles, and the copper oxide nanoparticles have pore structures therebetween.

Furthermore, the copper oxide with a hollow and porous structure has a size of 200 to 400 nm and a specific surface area of 23.5 to 79.6 m$^2$/g; and furthermore, the copper oxide nanoparticles have a size of 14 to 33 nm.

Also provided is a method for preparing a copper oxide with a hollow and porous structure, comprising:

(1) adding a strong reductant solution into a copper-based metal organic framework solution for chemical etching to give a precursor; and (2) calcining the precursor in step (1) at a high temperature to give the copper oxide with a hollow and porous structure.

Furthermore, the strong reductant in step (1) is selected from one or more of hydrazine hydrate, sodium borohydride, ammonia water, sodium thiosulfate, and oxalic acid;

preferably, the solvent in the strong reductant solution is water;

preferably, the mass ratio of the strong reductant to water is 0.05:1 to 2.5:1; and preferably, the time for the chemical etching is 5 min to 12 h.

Furthermore, the solvent in the copper-based metal organic framework solution in step (1) is selected from one or more of water, methanol, acetonitrile, N,N-dimethylformamide, and dimethyl sulfoxide;

preferably, the mass ratio of the copper-based metal organic framework to the solvent is (0.01 to 3):(7.857 to 33); and preferably, the copper-based metal organic framework is Cu-MOF-199.

Furthermore, the temperature of the high-temperature calcination in step (2) is 220 to 650° C., and the time is 1 h to 8 h.

Furthermore, the method further comprises: before calcining the precursor at a high temperature, washing and vacuum-drying the precursor obtained in step (1).

Furthermore, the solution adopted in the washing is selected from one or more of water, methanol-water, chitosan-water, and acetic acid-water; and preferably, the temperature of the vacuum drying is 80° C., and the time is 6 h to 72 h.

Furthermore, provided is use of the copper oxide with a hollow and porous structure or the copper oxide with a hollow and porous structure prepared by the method in the field of lithium-ion batteries, hydrogen storage, supercapacitors, electrocatalysis, or sensors;

preferably, use of the copper oxide with a hollow and porous structure as an electrode modification material;

preferably, use of the copper oxide with a hollow and porous structure in constructing an electrochemical biosensor; and preferably, use of the copper oxide with a hollow and porous structure in constructing an electrochemical biosensor based on acetylcholinesterase.

Furthermore, electrodes of the electrochemical biosensor are modified with acetylcholinesterase and a copper oxide with a hollow and porous structure; and preferably, the electrochemical biosensor is an electrochemical sensor for pesticide detection.

Compared with the prior art, the present invention has the following beneficial effects:

1. The present invention provides a copper oxide with a hollow and porous structure, wherein the copper oxide with a hollow and porous structure has a hollow octahedral structure, the surface of the octahedron is composed of copper oxide nanoparticles, and the copper oxide nanoparticles have pore structures therebetween. The porous structure of the hollow octahedron can significantly increase the specific surface area of the material, thus improving the conductivity and hydrophilicity; the ultra-small nanoparticles can significantly increase the exposure extent of surface active sites, which is conducive to improving the electrochemical activity of the material. The copper oxide with a hollow and porous structure has application value in the fields of metal ion batteries, hydrogen storage, supercapacitors, electrocatalysis, or sensors, especially in electrochemical pesticide detection where the material can significantly reduce the detection potential and greatly improve the detection sensitivity and anti-interference performance.

2. The present invention also provides a method for preparing a copper oxide with a hollow and porous structure, which gives the copper oxide with a hollow and porous structure by chemically etching a Cu-MOF precursor with a strong reductant, centrifugation, drying, and then further calcining at a high temperature. The strong reductant and metal nodes of the MOF are reduced into copper(II) or copper(I) which grows from the MOF, and the ligand is correspondingly changed into an amorphous structure, with the specific appearance being a hollow and porous structure as a nanorod structure on the outer wall, as shown in FIG. 1. The amorphous ligand disappears after the high-temperature calcination, and the metal loses support and becomes stable small particles. The method features ease of control and high reproducibility, thus facilitating large-scale production.

DETAILED DESCRIPTION OF THE EMBODIMENTS

In order to understand the present invention more clearly, the present invention will be further described with reference to the following examples and drawings. The examples are given for the purpose of illustration only and are not intended to limit the present invention in any way. In the examples, all of the reagents and starting materials are commercially available, and the experimental methods without specifying the specific conditions are conventional methods with conventional conditions well known in the art, or conditions suggested by the instrument manufacturer.

The Cu-MOF-199 used in the examples of the present invention was prepared by the method described in "Journal of Hazardous Materials 390 (2020) 122157".

Example 1

(1) 0.01 g of Cu-MOF-199 was uniformly dispersed into 7.857 g of solvent N,N-dimethylformamide. 0.05 g of hydrazine hydrate and 1 g of ultrapure water were mixed well, and the mixture was added slowly to the N,N-dimethylformamide solution while stirring. The mixture was stirred for 12 h for chemical etching.

(2) After the reaction was complete, the product was washed with ultrapure water and centrifuged 3 times each, and dried in vacuum at 80° C. for 72 h. Finally, the dried product was placed in a muffle furnace, and calcined for 8 h at 220° C. to give a copper oxide with a hollow and porous structure.

Figure 1:
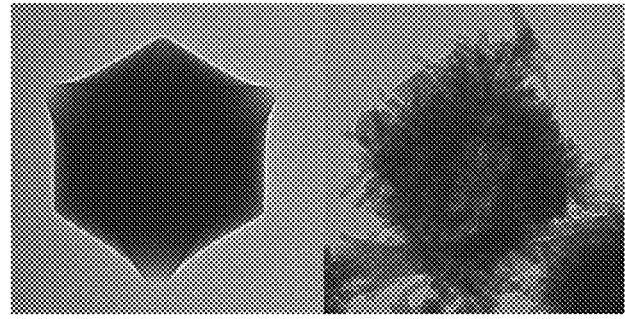
FIG. 1 shows the comparison of appearance before and after chemical etching.
Figure 2:
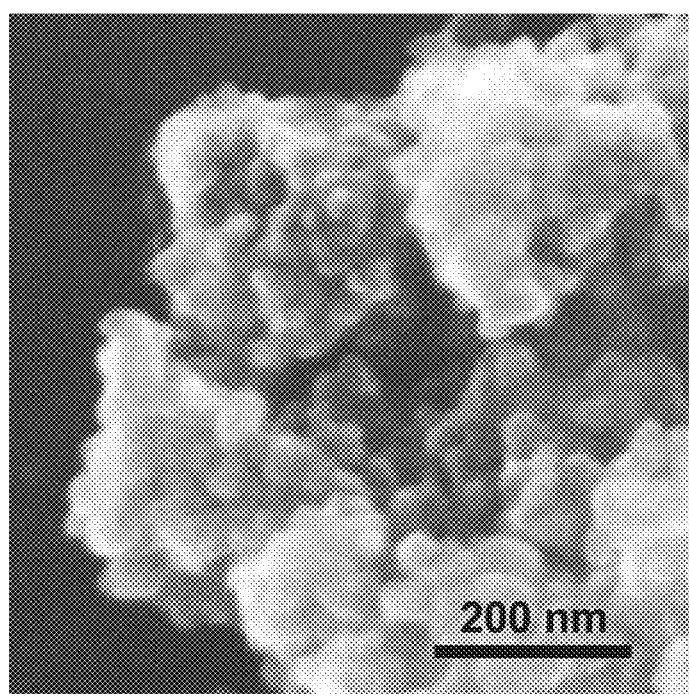
FIG. 2 shows a scanning electron micrograph of the copper oxide with a hollow and porous structure prepared in Example 1 according to the present invention.

As shown in FIG. 2, the prepared copper oxide had a diameter of 200 to 400 nm and a hollow structure with a rough surface of the material, which provided a large surface area, and a specific surface area of 23.5 $m^2/g$.

Example 2

(1) 3 g of Cu-MOF-199 was uniformly dispersed into 33 g of solvent dimethyl sulfoxide. 2.5 g of sodium borohydride and 1 g of ultrapure water were mixed well, and the mixture was added slowly to the dimethyl sulfoxide solution while stirring. The mixture was stirred for 5 min for chemical etching.

(2) After the reaction was complete, the product was washed with methanol-water and centrifuged 3 times each, and dried in vacuum at 80° C. for 6 h. Finally, the dried product was placed in a muffle furnace, and calcined for 1 h at 650° C. to give a copper oxide with a hollow and porous structure.

Figure 3:
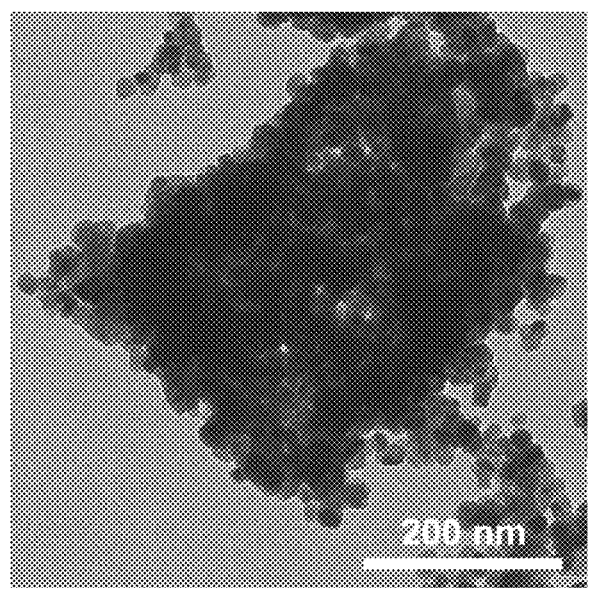
FIG. 3 shows a transmission electron micrograph of the copper oxide with a hollow and porous structure prepared in Example 2 according to the present invention.

As shown in FIG. 3, the prepared copper oxide with a hollow and porous structure had an octahedral hollow structure. The surface had obvious pores formed by nanoparticles with a size of 14 to 33 nm, which provided abundant active sites. The specific surface area was 79.6 $m^2/g$.

Example 3

(1) 1 g of Cu-MOF-199 was uniformly dispersed into 15 g of water. 1 g of ammonia water and 1 g of ultrapure water were mixed well, and the mixture was added slowly to the aqueous solution while stirring. The mixture was stirred for 20 min for chemical etching.

(2) After the reaction was complete, the product was washed with chitosan-water and centrifuged 3 times each, and dried in vacuum at 80° C. for 12 h. Finally, the dried product was placed in a muffle furnace, and calcined for 3 h at 350° C. to give a copper oxide with a hollow and porous structure.

Figure 4:
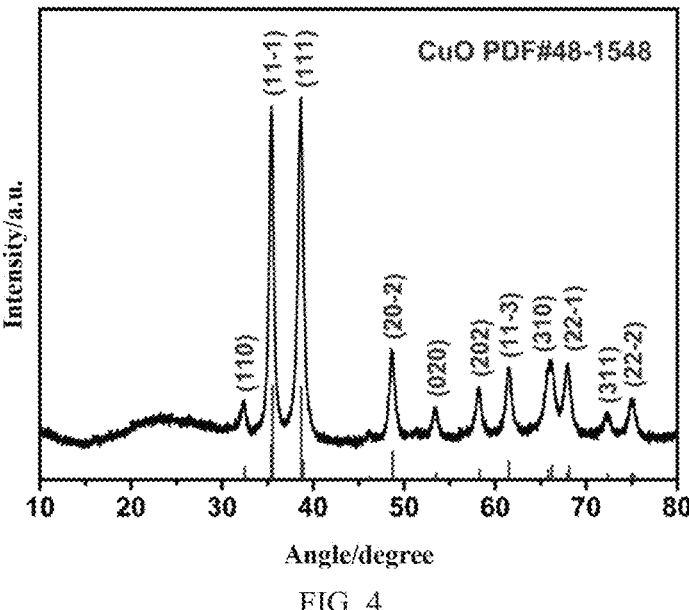
FIG. 4 shows an X-ray diffraction pattern of the copper oxide with a hollow and porous structure prepared in Example 3 according to the present invention.

As shown in FIG. 4, the X-ray diffraction pattern of the prepared copper oxide with a hollow and porous structure was consistent with the standard card of copper oxide; the diffraction peaks corresponded to (11$\bar{1}$), (111), (20$\bar{2}$), (310), and the like, indicating that the material prepared in the present invention is copper oxide.

Example 4

(1) 2 g of Cu-MOF-199 was uniformly dispersed into 20 g of methanol. 1.5 g of sodium thiosulfate and 1 g of ultrapure water were mixed well, and the mixture was added slowly to the methanol solution while stirring. The mixture was stirred for 6 h for chemical etching.

(2) After the reaction was complete, the product was washed with acetic acid-water and centrifuged 3 times each, and dried in vacuum at 80° C. for 24 h. Finally, the dried product was placed in a muffle furnace, and calcined for 4 h at 480° C. to give a copper oxide with a hollow and porous structure.

Figures 5, 6:
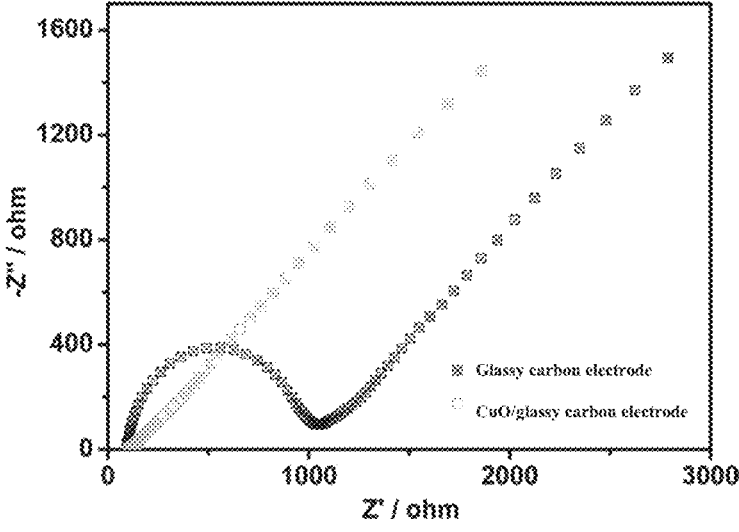
FIG. 5 shows an alternating current impedance curve of the copper oxide with a hollow and porous structure prepared in Example 4 according to the present invention modifying a glassy carbon electrode.
FIG. 6 shows the contact angle of the copper oxide with a hollow and porous structure prepared in Example 5 according to the present invention.

As shown in FIG. 5, after the glassy carbon electrode was modified with the copper oxide with a hollow and porous structure, an electrochemical impedance test was performed on the glassy carbon electrode by using a three-electrode system. In the Nyquist curve, the curve radius of the electrode modified with the copper oxide was much smaller than that of a bare glassy carbon electrode, which reduced the resistance from 900Ω to 10Ω, suggesting that the copper oxide with a hollow and porous structure has excellent conductivity.

Example 5

(1) 2.5 g of Cu-MOF-199 was uniformly dispersed into 25 g of acetonitrile. 0.5 g of oxalic acid and 1 g of ultrapure water were mixed well, and the mixture was added slowly to the acetonitrile solution while stirring. The mixture was stirred for 1.5 h for chemical etching.

(2) After the reaction was complete, the product was washed with methanol-water and centrifuged 3 times each, and dried in vacuum at 80° C. for 48 h. Finally, the dried product was placed in a muffle furnace, and calcined for 6 h at 600° C. to give a copper oxide with a hollow and porous structure.

As shown in FIG. 6, when the glassy carbon electrode was modified with the hollow octahedral porous copper oxide, the contact angle was only 26.523°, suggesting that the copper oxide has high hydrophilicity.

Figure 7:
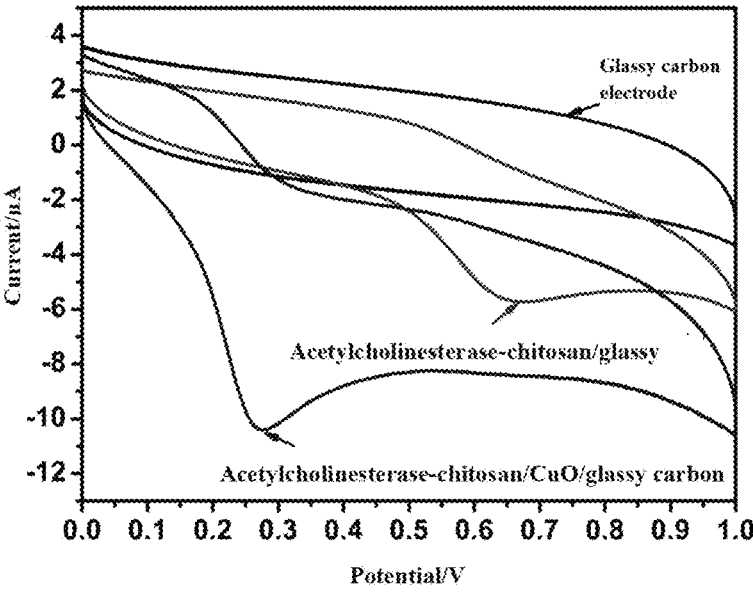
FIG. 7 shows a cyclic voltammogram of the copper oxide with a hollow and porous structure prepared in Example 5 according to the present invention modifying a glassy carbon electrode.

As shown in FIG. 7, when a cyclic voltammogram test of acetylthiocholine chloride was performed on a glassy carbon electrode modified with acetylcholinesterase and the copper oxide, the detection potential of the electrode modified with acetylcholinesterase/copper oxide was significantly reduced from 0.68 V to 0.28 V, and compared with an acetylcholinesterase-modified electrode and an existing electrode, the detection potential was greatly reduced in the presence of the copper oxide.

It is obvious that the above examples are merely illustrative for a clear explanation and are not intended to limit the implementations. Various changes and modifications can be made by those of ordinary skills in the art on the basis of the above description. It is unnecessary and impossible to exhaustively list all the implementations herein. Obvious changes or modifications derived therefrom still fall within the protection scope of the present invention.

What is claimed is:

1. A method of constructing an electrochemical biosensor; wherein the method comprises:

modifying an electrode by applying a copper oxide with a hollow and porous structure to the electrode to form an electrode modification layer on a surface of the electrode;

wherein the copper oxide with the hollow and porous structure has a hollow octahedral structure, a surface of the hollow octahedral structure is composed of copper oxide nanoparticles, and the copper oxide nanoparticles have pore structures there between.

2. The method of constructing an electrochemical biosensor according to claim 1, wherein the method further comprises incorporating an acetylcholinesterase into the electrochemical biosensor.

3. The method of constructing an electrochemical biosensor according to claim 1, wherein the copper oxide with the hollow and porous structure has a size of 200 to 400 nm and a specific surface area of 23.5 to 79.6 $m^2/g$; and each of the copper oxide nanoparticles has a size of 14 to 33 nm.

* * * * *